(12) United States Patent
Scarlata et al.

(10) Patent No.: US 10,880,097 B2
(45) Date of Patent: *Dec. 29, 2020

(54) FLEXIBLE PROVISIONING OF ATTESTATION KEYS IN SECURE ENCLAVES

(71) Applicant: Intel Corporation, Santa Clara, CA (US)

(72) Inventors: Vincent R. Scarlata, Beaverton, OR (US); Francis X. McKeen, Portland, OR (US); Carlos V. Rozas, Portland, OR (US); Simon P. Johnson, Beaverton, OR (US); Bo Zhang, Raleigh, NC (US); James D. Beaney, Jr., Raleigh, NC (US); Piotr Zmijewski, Kartuzy (PL); Wesley H. Smith, Raleigh, NC (US); Eduardo Cabre, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 107 days.

This patent is subject to a terminal disclaimer.

(21) Appl. No.: 16/162,776

(22) Filed: Oct. 17, 2018

(65) Prior Publication Data

US 2019/0052469 A1 Feb. 14, 2019

Related U.S. Application Data

(63) Continuation of application No. 15/279,527, filed on Sep. 29, 2016, now Pat. No. 10,135,622.

(Continued)

(51) Int. Cl.
*H04L 9/32* (2006.01)
*G09C 1/00* (2006.01)
(Continued)

(52) U.S. Cl.
CPC ............ *H04L 9/3252* (2013.01); *G06F 21/44* (2013.01); *G06F 21/53* (2013.01); *G09C 1/00* (2013.01);
(Continued)

(58) Field of Classification Search
CPC ......... H04L 9/0866; H04L 9/14; H04L 9/302; H04L 3/3066; H04L 9/3234;
(Continued)

(56) References Cited

U.S. PATENT DOCUMENTS 7,711,951 B2 * 5/2010 Chao .................... G06F 21/445
713/156
8,112,798 B2 * 2/2012 Frank .................. G06F 11/0706
705/52

(Continued)

FOREIGN PATENT DOCUMENTS

WO 2016077007 A1 5/2016
WO 2017210145 A1 12/2017

OTHER PUBLICATIONS

Final Office Action issued in U.S. Appl. No. 15/279,527 dated Apr. 3, 2018 14 pages.

(Continued)

*Primary Examiner* — Samson B Lemma
(74) *Attorney, Agent, or Firm* — Patent Capital Group (57) ABSTRACT

A computing platform implements one or more secure enclaves including a first provisioning enclave to interface with a first provisioning service to obtain a first attestation key from the first provisioning service, a second provisioning enclave to interface with a different, second provisioning service to obtain a second attestation key from the second provisioning service, and a provisioning certification enclave to sign first data from the first provisioning enclave and second data from the second provisioning enclave using (Continued)

a hardware-based provisioning attestation key. The signed first data is used by the first provisioning enclave to authenticate to the first provisioning service to obtain the first attestation key and the signed second data is used by the second provisioning enclave to authenticate to the second provisioning service to obtain the second attestation key.

7 Claims, 9 Drawing Sheets

Related U.S. Application Data (60) Provisional application No. 62/345,325, filed on Jun. 3, 2016.

(51) Int. Cl.
    *G06F 21/53*      (2013.01)
    *H04L 29/06*      (2006.01)
    *G06F 21/44*      (2013.01)
    *H04L 9/08*      (2006.01)
    *H04L 9/14*      (2006.01)
    *H04L 9/30*      (2006.01)

(52) U.S. Cl.
CPC .............. *H04L 9/0866* (2013.01); *H04L 9/14* (2013.01); *H04L 9/302* (2013.01); *H04L 9/3066* (2013.01); *H04L 9/3234* (2013.01); *H04L 9/3247* (2013.01); *H04L 9/3249* (2013.01); *H04L 63/06* (2013.01); *H04L 63/062* (2013.01); *H04L 63/0823* (2013.01); *H04L 63/12* (2013.01); *H04L 2209/127* (2013.01)

(58) Field of Classification Search
CPC ... H04L 9/3247; H04L 9/3249; H04L 9/3252; H04L 63/06; H04L 63/062; H04L 63/0823; H04L 63/12; H04L 2209/127; G06F 21/44; G06F 21/53

USPC ........................................................ 713/176
See application file for complete search history.

(56) References Cited

U.S. PATENT DOCUMENTS

| | | | | |
|---|---|---|---|---|
| 8,176,336 | B1* | 5/2012 | Mao | H04L 9/006 713/189 |
| 9,361,465 | B2* | 6/2016 | Lortz | G06F 21/60 |
| 2009/0158409 | A1* | 6/2009 | Khosravi | H04W 12/06 726/6 |
| 2012/0173877 | A1* | 7/2012 | Pendakur | G06F 21/72 713/169 |
| 2012/0198514 | A1* | 8/2012 | McCune | G06F 21/57 726/1 |
| 2014/0007087 | A1 | 1/2014 | Scott-Nash et al. | |
| 2014/0032920 | A1* | 1/2014 | Gehrmann | H04L 9/0822 713/176 |
| 2014/0059694 | A1* | 2/2014 | Lortz | H04L 63/12 726/26 |
| 2014/0281493 | A1 | 9/2014 | Nakhjiri | |
| 2015/0113618 | A1* | 4/2015 | Sinha | H04L 63/107 726/6 |
| 2015/0319160 | A1* | 11/2015 | Ferguson | G06F 21/6281 726/10 |
| 2016/0134621 | A1* | 5/2016 | Palanigounder | H04L 9/3268 713/156 |
| 2017/0230361 | A1* | 8/2017 | Toth | H04L 63/0823 |
| 2017/0353319 | A1 | 12/2017 | Scarlata et al. | |

OTHER PUBLICATIONS

International Search Report and Written Opinion in International Application No. PCT/US2017/034897 dated Aug. 24, 2017, 17 pages.
Non-Final Office Action issued in U.S. Appl. No. 15/279,527 dated Nov. 20, 2017 19 pages.

* cited by examiner

FLEXIBLE PROVISIONING OF ATTESTATION KEYS IN SECURE ENCLAVES

This application is a continuation of and claims benefit under 35 U.S.C. § 120 to U.S. patent application Ser. No. 15/279,527 filed Sep. 29, 2016 which claims the benefit of priority to U.S. Provisional Patent Application Ser. No. 62/345,325, filed Jun. 3, 2016. The disclosures of the prior applications are considered part of and are hereby incorporated by reference in their entirety in the disclosure of this application.

TECHNICAL FIELD

This disclosure relates in general to the field of computer security and, more particularly, to secure enclaves within a computing system.

BACKGROUND

Software and services can be deployed over the Internet. Some services may be hosted on virtual machines to allow flexible deployment of a service. A virtual machine is an emulation of a computing system and can allow the service to migrate between or be launched simultaneously on multiple physical server systems. Software services may communicate data with other systems over wireline or wireless network. Some of this data may include sensitive content. While encryption and authentication may be utilized to secure communications between systems, trust may be required between the systems in order to facilitate such transactions. Malicious actors have employed techniques such as spoofing, man-in-the-middle attacks, and other actions in an attempt to circumvent safety measures put in place within systems to secure communications. Failure to establish a trusted relationship may make traditional communication security tasks ineffective.

BRIEF DESCRIPTION OF THE DRAWINGS

Like reference numbers and designations in the various drawings indicate like elements.

DETAILED DESCRIPTION OF EXAMPLE EMBODIMENTS

Figure 1:
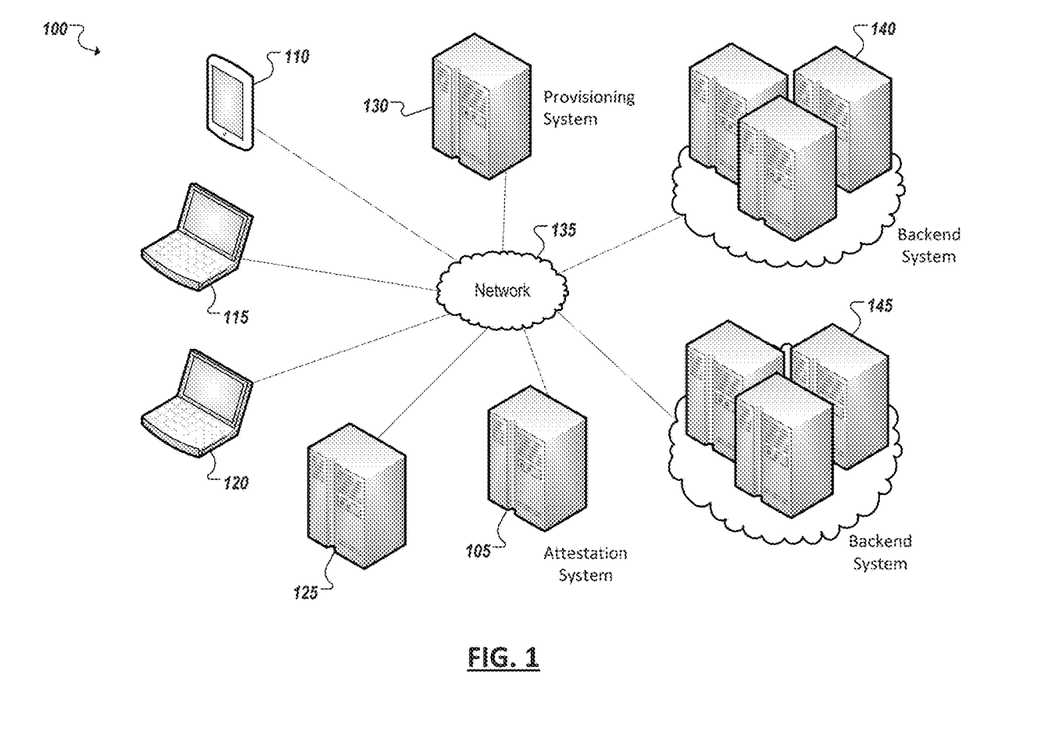
FIG. 1 is a simplified schematic diagram of an example system including an attestation system in accordance with one embodiment.

FIG. 1 is a simplified block diagram illustrating an example embodiment of a computing environment 100 including an example attestation system 105. The attestation system 105 can receive data, or "quotes," generated by secured logical components, or enclaves, running on host systems (e.g., 110, 115, 120, 125) to attest to the authenticity and security (and other characteristics) of another application or enclave of the host and confirm the attestation based on the received quote. The quote can be signed or include data that has been signed by a cryptographic key, cipher, or other element (collectively referred to herein as "keys") from which the attestation system can authenticate or confirm the trustworthiness of the quote (and thereby also the application or enclave attested to by the quote). Such keys can be referred to as attestation keys. A provisioning system 130 can be utilized to securely provision such attestation keys on the various host devices 110, 115, 120, 125.

In some cases, attestation can be carried out in connection with a client-server or frontend-backend interaction (e.g., over one or more networks 135) between an application hosted on a host system (e.g., 110, 115, 120, 125) and a backend service hosted by a remote backend system (e.g., 140, 145). Sensitive data and transactions can take place in such interactions and the application can attest to its trustworthiness and security to the backend system (and vice versa) using an attestation system (e.g., 105). In some implementations, the attestation system itself can be hosted on the backend system. In other cases, a backend system (e.g., 140) (or even another host device in a peer-to-peer attestation) can consume the attestation services of a separate attestation system (e.g., 105).

A provisioning system can maintain a database of certificates mapped to various host devices (e.g., 110, 115, 120, 125) equipped with hardware and software to implement trusted execution environments, or secure enclaves. Each of the certificates can be derived from keys that are themselves based on persistently maintained, secure secrets provisioned on the host devices (e.g., 110, 115, 120, 125) during manufacture. The secrets remain secret to the host device and may be implemented as fuses, a code in secure persistent memory, among other implementations. The key may be the secret itself or a key derived from the secret. The certificate may not identify the key and the key may not be derivable from the certificate, however, signatures produced by the key may be identified as originating from a particular one of the host devices for which a certificate is maintained based on the corresponding certificate. In this manner, a host device (e.g., 110, 115, 120, 125) can authenticate to the provisioning system 130 and be provided (by the provisioning system 130) with an attestation key that is securely associated with the host device. These attestation keys can then be used by secure enclaves on the corresponding host device (e.g., 110, 115, 120, 125) to attest to one or more applications or enclaves present on the host device.

As noted, client systems, host devices (e.g., 110, 115, 120, 125) may interface and communicate with other systems, including backend systems (e.g., 140, 145) and attestation systems (e.g., 105) and key provisioning systems 130 over one or more network channels (of network 135). Cryptography may be employed to secure communications over these network channels. Networks 135, in some implementations, can include local and wide area networks, wireless and wireline networks, public and private networks, and any other communication network enabling communication between the systems.

In general, "servers," "devices," "computing devices," "host devices," "user devices," "clients," "servers," "computers," "platform," "environment," "systems," etc. (e.g., 105, 110, 115, 120, 125, 130, 140, 145, etc.) can include electronic computing devices operable to receive, transmit, process, store, or manage data and information associated with the computing environment 100. As used in this document, the term "computer," "computing device," "processor," or "processing device" is intended to encompass any suitable processing device adapted to perform computing tasks consistent with the execution of computer-readable instructions. Further, any, all, or some of the computing devices may be adapted to execute any operating system, including Linux, UNIX, Windows Server, etc., as well as virtual machines adapted to virtualize execution of a particular operating system, including customized and proprietary operating systems. Computing devices may be further equipped with communication modules to facilitate communication with other computing devices over one or more networks (e.g., 135). Such networks 135 may include local and wide area networks, wireless and wireline networks, public and private networks, and any other communication network enabling communication between systems.

Host devices (e.g., 110, 115, 120, 125) can further computing devices implemented as one or more local and/or remote client or end user devices, such as application servers, personal computers, laptops, smartphones, tablet computers, personal digital assistants, media clients, web-enabled televisions, telepresence systems, gaming systems, multimedia servers, set top boxes, smart appliances, in-vehicle computing systems, and other devices adapted to receive, view, compose, send, or otherwise interact with, access, manipulate, consume, or otherwise use applications, programs, and services served or provided through servers within or outside the respective device (or environment 100). A host device can include any computing device operable to connect or communicate at least with servers, other host devices, networks, and/or other devices using a wireline or wireless connection. A host device, in some instances, can further include at least one graphical display device and user interfaces, including touchscreen displays, allowing a user to view and interact with graphical user interfaces of applications, tools, services, and other software of provided in environment 100. It will be understood that there may be any number of host devices associated with environment 100, as well as any number of host devices external to environment 100. Further, the term "host device," "client," "end user device," "endpoint device," and "user" may be used interchangeably as appropriate without departing from the scope of this disclosure. Moreover, while each end user device may be described in terms of being used by one user, this disclosure contemplates that many users may use one computer or that one user may use multiple computers, among other examples.

While FIG. 1 is described as containing or being associated with a plurality of elements, not all elements illustrated within system 100 of FIG. 1 may be utilized in each alternative implementation of the present disclosure. Additionally, one or more of the elements described herein may be located external to system 100, while in other instances, certain elements may be included within or as a portion of one or more of the other described elements, as well as other elements not described in the illustrated implementation. Further, certain elements illustrated in FIG. 1 may be combined with other components, as well as used for alternative or additional purposes in addition to those purposes described herein.

Figure 2:
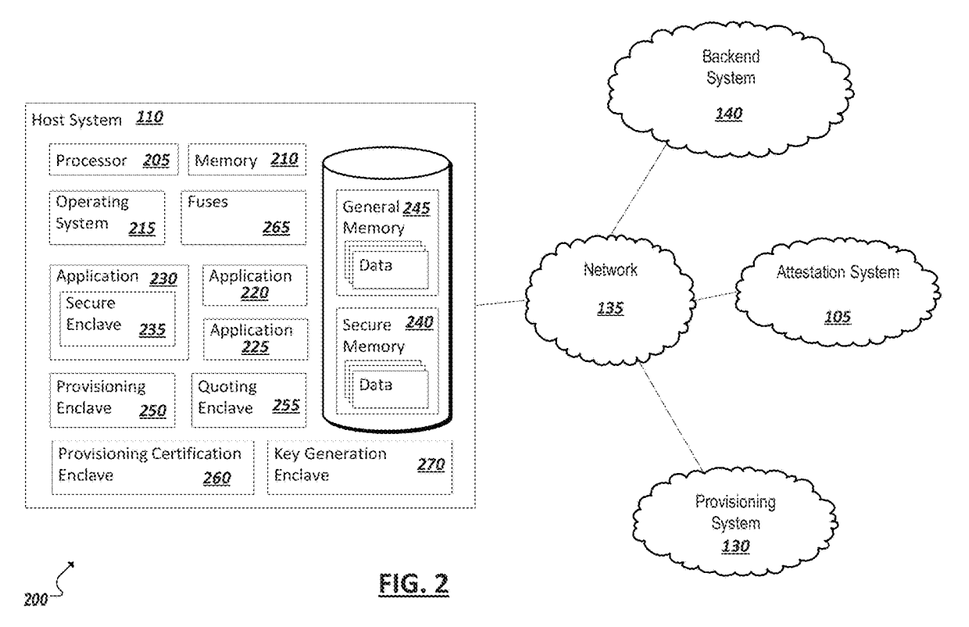
FIG. 2 is a simplified block diagram of an example system including an example platform supporting secure enclaves in accordance with one embodiment.

Turning to the example of FIG. 2, a simplified block diagram 200 is shown illustrating a system or computing environment that includes a host system 110 equipped to support one or more secure enclaves (e.g., 235, 250, 255, 260, 265). A host system 110 can include one or more processor devices 205, one or more memory elements 210, and other components implemented in hardware and/or software, including an operating system 215 and a set of applications (e.g., 220, 225, 230). One or more of the applications may be secured using a secure enclave 235, or application enclave. Secure enclaves can be implemented in secure memory 240 (as opposed to general memory 245) and utilizing secured processing functionality of at least one of the processors (e.g., 205) of the host system to implement private regions of code and data to provide certain secured or protected functionality of the application. Logic, implemented in firmware and/or software of the host system (such as code of the CPU of the host), can be provided on the host system 110 that can be utilized by applications or other code local to the host system to set aside private regions of code and data, which are subject to guarantees of heightened security, to implement one or more secure enclaves on the system. For instance, a secure enclave can be used to protect sensitive data from unauthorized access or modification by rogue software running at higher privilege levels and preserve the confidentiality and integrity of sensitive code and data without disrupting the ability of legitimate system software to schedule and manage the use of platform resources. Secure enclaves can enable applications to define secure regions of code and data that maintain confidentiality even when an attacker has physical control of the platform and can conduct direct attacks on memory. Secure enclaves can further allow consumers of the host devices (e.g., 110) to retain control of their platforms including the freedom to install and uninstall applications and services as they choose. Secure enclaves can also enable a host system platform to measure a corresponding application's trusted code and produce a signed attestation, rooted in the processor, that includes this measurement and other certification that the code has been correctly initialized in a trustable environment (and is capable of providing the security features of a secure enclave, such as outlined in the examples above). Generally, secure enclaves (and other secured enclaves described herein) can adopt or build upon principles described, for instance, in the Intel® Software Guard Extensions (SGX) Programming Reference, among other example platforms.

Figure 3:
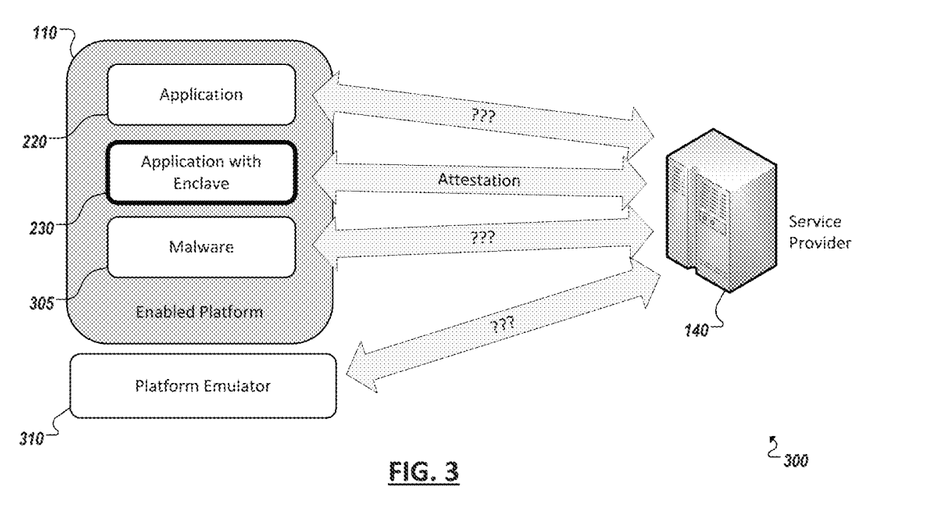
FIG. 3 is a simplified block diagram representing application attestation in accordance with one embodiment.

Turning briefly to FIG. 3, a simplified block diagram 300 is presented illustrating protection afforded through a secure enclave. For instance, in this example, an application enclave (e.g., 235) can protect all or a portion of a given application and allow the application (and its security features) to be attested to. For instance, a service provider 140, such as a backend service or web service, may prefer or require that clients, with which it interfaces, possess certain security features or guarantees, such that the service 140 can verify that it is transacting with who the client says it is. For instance, malware (e.g., 305) can sometimes be constructed to spoof the identity of a user or an application in an attempt to extract sensitive data from, infect, or otherwise behave maliciously in a transaction with the service 140. Signed attestation (or simply "attestation") can allow an application (e.g., 230) to verify that it is a legitimate instance of the application (i.e., and not malware). Other applications (e.g., 220) that are not equipped with a secure application enclave may be legitimate, but may not attest to the service provider 140, leaving the service provider in doubt, to some degree, of the application's authenticity and trustworthiness. Further, host system platforms (e.g., 210) can be emulated (e.g., by emulator 310) to attempt to transact falsely with the service 140. Attestation through a secure enclave can guard against such insecure, malicious, and faulty transactions.

Returning to FIG. 2, attestation can be provided on the basis of a signed piece of data, or "quote," that is signed using an attestation key securely provisioned on the platform. Additional secured enclaves can be provided (i.e., separate from the secure application enclave 235) to measure or assess the application and its enclave 235, sign the measurement (included in the quote), and assist in the provisioning of one or more of the enclaves with keys for use in signing the quote and establishing secured communication channels between enclaves or between an enclave and an outside service (e.g., 105, 130, 140). For instance, one or more provisioning enclaves 250 can be provided to interface with a corresponding provisioning system to obtain attestation keys for use by a quoting enclave 255 and/or application enclave. One or more quoting enclaves 255 can be provided to reliably measure or assess an application 230 and/or the corresponding application enclave 235 and sign the measurement with the attestation key obtained through the corresponding provisioning enclave 250. A provisioning certification enclave 260 may also be provided to authenticate a provisioning enclave (e.g., 250) to its corresponding provisioning system (e.g., 130). The provisioning certification enclave 260 can maintain a provisioning attestation key that is based on a persistently maintained, secure hardware-based secret on the host platform 110, such as a secret set in fuses 265 of the platform during manufacturing, to support attestation of the trustworthiness of the provisioning enclave 250 to the provisioning system 130, such that the provisioning enclave 250 is authenticated prior to the provisioning system 130 entrusting the provisioning enclave 250 with an attestation key. In some implementations, the provisioning certification enclave 260 can attest to authenticity and security of any one of potentially multiple provisioning enclaves 250 provided on the platform 110. For instance, multiple different provisioning enclaves 250 can be provided, each interfacing with its own respective provisioning system, providing its own respective attestation keys to one of potentially multiple quoting enclaves (e.g., 255) provided on the platform. For instance, different application enclaves can utilize different quoting enclaves during attestation of the corresponding application, and each quoting enclave can utilize a different attestation key to support the attestation. Further, through the use of multiple provisioning enclaves and provisioning services, different key types and encryption technologies can be used in connection with the attestation of different applications and services (e.g., hosted by backend systems 140).

In some implementations, rather than obtaining an attestation key from a remote service (e.g., provisioning system 130), one or more applications and quoting enclaves can utilize keys generated by a key generation enclave 270 provided on the platform. To attest to the reliability of the key provided by the key generation enclave, the provisioning certification enclave can sign the key (e.g., the public key of a key pair generated randomly by the key generation enclave) such that quotes signed by the key can be identified as legitimately signed quotes. In some cases, key generation enclaves (e.g., 270) and provisioning enclaves (e.g., 250) can be provided on the same platform, while in other instances, key generation enclaves (e.g., 270) and provisioning enclaves (e.g., 250) can be provided as alternatives for the other (e.g., with only a key generation enclave or provisioning enclaves be provided on a given platform), among other examples and implementations.

Figure 4:
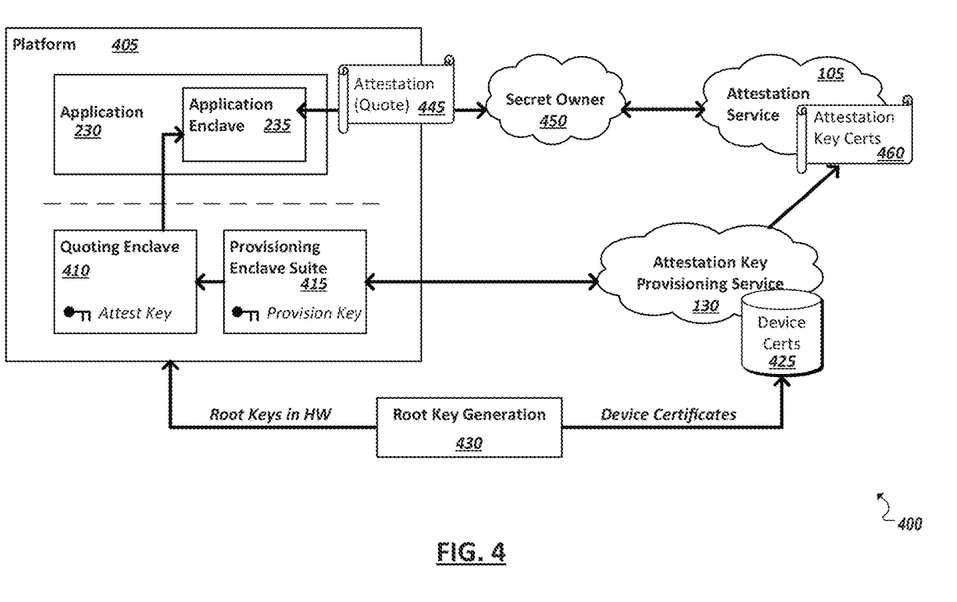
FIG. 4 is a simplified block diagram representing a first implementation of a system supporting attestation in accordance with one embodiment.

Turning to the simplified block diagram 400 of FIG. 4, in some platforms (e.g., 405), a single quoting enclave 410 is provided and interfaces directly with a provisioning enclave suite 415. The same quoting enclave is used here for each application enclave 235 provided on the system. A provisioning key is hosted in the provisioning enclave suite 415 and is used to authenticate the provisioning suite 415 to an attestation key provisioning service 130. The attestation key provisioning service can maintain device certificates 425 that map devices (e.g., device serial numbers) to corresponding certificates, each certificate generated based on root keys set (and kept in secret) in hardware of the device platform 405 (e.g., by a root key generator 430, such as the manufacturer of the platform 405). In this manner, certificates 425 can be provided, which do not disclose the hardware-based secret maintained at the device 405, but allow the presence of the secret to be verified by the certificate holder (e.g., based on a signature generated from the secret or a key based on the secret). Accordingly, the provisioning enclave suite 415 can provide signed data to the attestation key provisioning service 130 to attest to its authenticity and that it is implemented on a device platform (e.g., 405) known to possess functionality enabling the instantiation and hosting of a secure, trustworthy enclave. Based on this attestation, the attestation key provisioning service 130 can negotiate a secure channel between the attestation key provisioning service 130 and the provisioning enclave suite 415 and provide an attestation key to the provisioning enclave suite 415 in response. Indeed, the data signed by the provisioning enclave suite 415 can include information (e.g., signed public keys, protocol identifiers, etc.) used to establish the secure channel. The provisioning enclave suite 415 can then provision the quoting enclave with the received attestation key.

A quoting enclave (e.g., 410) can measure or identify attributes of the application (e.g., 230) and/or application enclave (e.g., 235) as well as the hosting platform and can provide this information in a quote 445 containing data, at least a portion of which is signed using the attestation key at the quoting enclave. For instance, a quote (e.g., 445) may be data including information and authentication data (e.g., signatures) from which an attestation service may verify the trustworthiness of the component, platform, or enclave being attested to through the quote. A quote (e.g., 445) may identify such characteristics as the type and identifier of the platform processor (e.g., CPU, chipset, etc.), firmware version used by the processor(s), identification and status of any authenticated code modules (ACMs) of the processor(s), presence of trusted boot functionality, firmware of all trusted devices, software versions for any enclave providing security services, among other examples. The quoting enclave 410 may sign at least a portion of the quote data (e.g., 445) with the attestation key and pass the signed quote to the application enclave 235, which can communicate the quote to a backend service (such as a secret owner 450 (e.g., hosting secrets usable by the application to decrypt data or access content, etc.) to attest the authenticity of the application. In this example, the backend service (e.g., "secret owner") 450 can utilize the services of an attestation service 105, which can receive attestation key certificates 460 and revocation lists generated by the attestation key provisioning service 130 that generated the attestation key used by the quoting enclave 410 of the platform 405. Through these certificates, the attestation service 105 can verify the authenticity of the quote 445 based on the signature included in the quote (signed by the attestation key provided by the attestation key provisioning service). Upon verifying the authenticity of the quote 445 and further verifying, from the description of the application enclave 235 included in the quote 445, the characteristics of the application enclave 235 (e.g., that it is a reliably implemented enclave on a capable platform), the attestation service can communicate the results of the attestation to the backend service. From these results, the backend service can provide a level of service (or grant/deny service entirely) based on whether or not the application is protected by a trustworthy application enclave.

Figure 5:
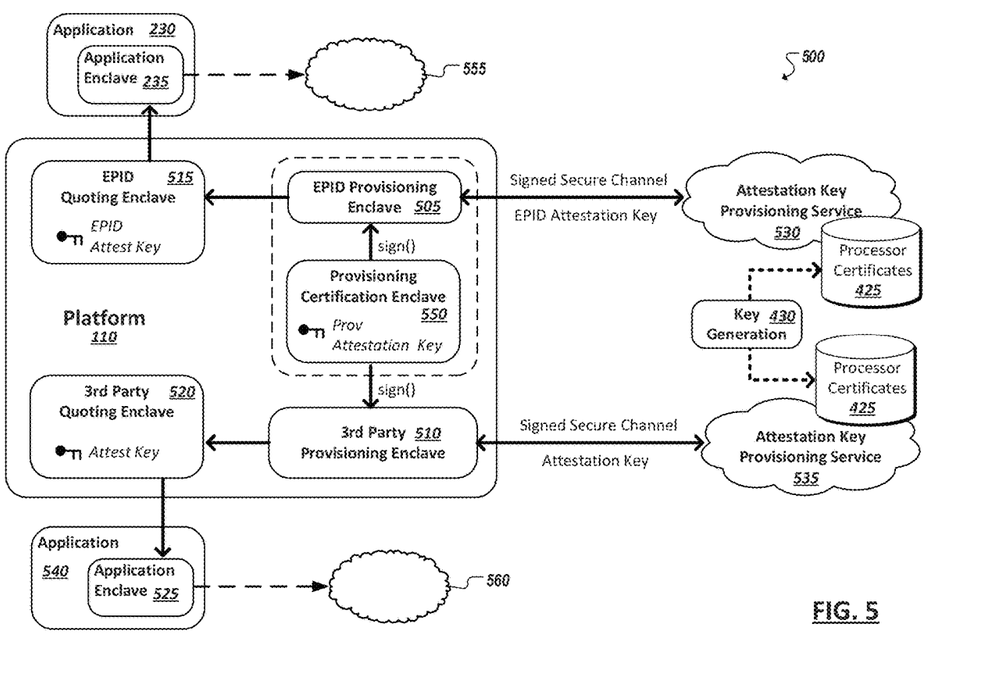
FIG. 5 is a simplified block diagram representing a second implementation of a system supporting attestation in accordance with one embodiment.

Turning to the example of FIG. 5, a simplified block diagram 500 is shown illustrating an improved version of an attestation platform provided on a device platform. In this example, multiple potential provisioning enclaves (e.g., 505, 515) and quoting enclaves (e.g., 515, 520) are supported. For instance, an Enhanced Privacy Identifier (EPID)-based provisioning enclave 505 (corresponding to or provided in connection with a manufacturer of the device platform) can be instantiated to provision a first quoting enclave 515 that uses a first type of attestation key (e.g., an EPID key) and a second provisioning enclave 510 (corresponding to a third-party (i.e., other than the provider or manufacturer of the platform)) can provision a second quoting enclave 520 that potentially uses a different, second type of attestation key (e.g., an RSA key), among other examples. Indeed, two or more different provisioning enclaves (e.g., 505, 510) can be provided to provision attestation keys on two or more distinct quoting enclaves (e.g., 515, 520). In turn, each of these quoting enclaves 515, 520 can provide attestation support to one or more applications (e.g., 230, 540) provided with application enclaves (e.g., 235, 525). For instance, one quoting enclave can support one, two, or more application enclaves, another quoting enclave can support another application enclave, etc.). These multiple provisioning enclaves 505, 510 can be supported by a single provisioning certification enclave 550, which manages a provisioning attestation key generated from a persistently and securely maintained secret of the device (e.g., a root key) set during manufacturing of the device.

In the example of FIG. 5, each of the various provisioning enclaves (e.g., 505, 510) can be associated with a corresponding provisioning service (e.g., 530, 535), from which respective attestation keys are to be obtained. The provisioning certification enclave can effectively serve to support the attestation of the provisioning enclave to its corresponding provisioning service. For instance, an EPID provisioning enclave, in order to provision a corresponding quoting enclave (e.g., 505) with an EPID-based attestation key, can request an attestation quote from the provisioning certification enclave 550 that is signed using the provisioning attestation key. The provisioning certification enclave 550 can generate the signature using the provisioning attestation key and provide the signature (or signed attestation quote) to the EPID provisioning enclave 505. The signed quote can be shared with the corresponding provisioning service (e.g., 530) to authenticate to the provisioning service 530 and establish a secure channel between the provisioning service 530 and provisioning enclave 505. The attestation quote can include information (e.g., signed public keys, protocol identifiers, etc.) used to establish the secure channel. As in the example of FIG. 4, each of the (potentially multiple different) provisioning services (e.g., 530, 535) may have a copy of the certificates 425, which have been issued (by a key generator 430) for each of a collection of platforms (e.g., 110) configured to support secure enclaves and attestation and which are based on the root keys (or other secrets) set at each of the respective device platforms at (or following) manufacture. These certificates obscure the secret upon which the provisional attestation key is based, but may be used to decrypt information and verify signatures generated using a corresponding one of these provisional attestation keys (upon which the certificates are also based).

Accordingly, a provisioning enclave (e.g., 505, 510) can provide a quote signed with the provisional attestation key, which is verifiable at any one of the provisioning services having access to the processor certificates. A secure channel can be established based on the attestation of the provisioning enclave (e.g., using a public key exchange, or other technology). The provisioning service may obtain an attestation key and the provisioning service may generate a corresponding certificate based on communications between the provisioning enclave and provisioning service over the secure channel. In one example, the provisioning service may generate the attestation key, generate a corresponding certificate, and transmit the attestation key to the corresponding provisioning enclave. In another example, the provisioning enclave may generate the attestation key (e.g., randomly) and conduct a negotiation over the secure channel to enable the provisioning service to generate a certificate corresponding to the attestation key (e.g., for the public key of an attestation key pair (e.g., using EPID join protocol)). The provisioning enclave can then provision the attestation key onto a corresponding quoting enclave. Similarly, other provisioning enclaves (e.g., 510) can also request a signed quote from the provisioning certification enclave 550 that the provisioning enclave 510 can use as the basis of negotiating its own secure channel with a corresponding provisioning service (e.g., 535) and attest to its trustworthiness as a provisioning enclave. Likewise, a corresponding attestation key can be obtained the provisioning enclave, which may be passed to its corresponding quoting enclave (e.g., 520) for use in attesting to one or more corresponding application enclaves. As in the example of FIG. 4, the application enclaves (e.g., 235, 525) can receive quotes signed by their respective quoting enclaves (e.g., 515, 520, using their corresponding attestation keys) to attest to various backend systems (e.g., 555, 560) and enjoy heightened access and functionality on the basis of the application being protected by a trusted application enclave. Such attestations can provide a variety of privileges and enhanced services and features, such as authorizing a service, authorizing additional services (premised on the presence of an application enclave on the client), issuance of certificates from a certificate authority, allow sensor-type platforms to pair with a coordination point and/or allow data to be accepted from sensors (e.g., in an Internet of Things system), among potentially limitless other examples.

As noted above, in some implementations, a key generator enclave 270 can be provided as opposed to (or in addition to) one or more provisioning enclaves (e.g., 505, 510), which ultimately rely on outside provisioning services (e.g., 530, 535) as a respective source of attestation keys to be passed to corresponding quoting enclaves (e.g., 515, 520). For instance, in the example illustrated by the simplified block diagram 600 shown in FIG. 6, a key generator enclave 270 can be provided, which generates random public/private attestation key pairs for use in provisioning one or more quoting enclaves (e.g., 605, 610) with attestation keys. For instance, the key generator enclave 270 can generate (at random) a first attestation key pair (e.g., an RSA, EPID, or Elliptic Curve Digital Signature Algorithm (ECDSA) key pair) for a first quoting enclave 605 and separately generate another, second attestation key pair for another quoting enclave 610 (using the same or a different key pair algorithm or technology). The private key of the attestation key pair is passed to the quoting enclave 605 for use as the attestation key of the quoting enclave.

Figure 6:
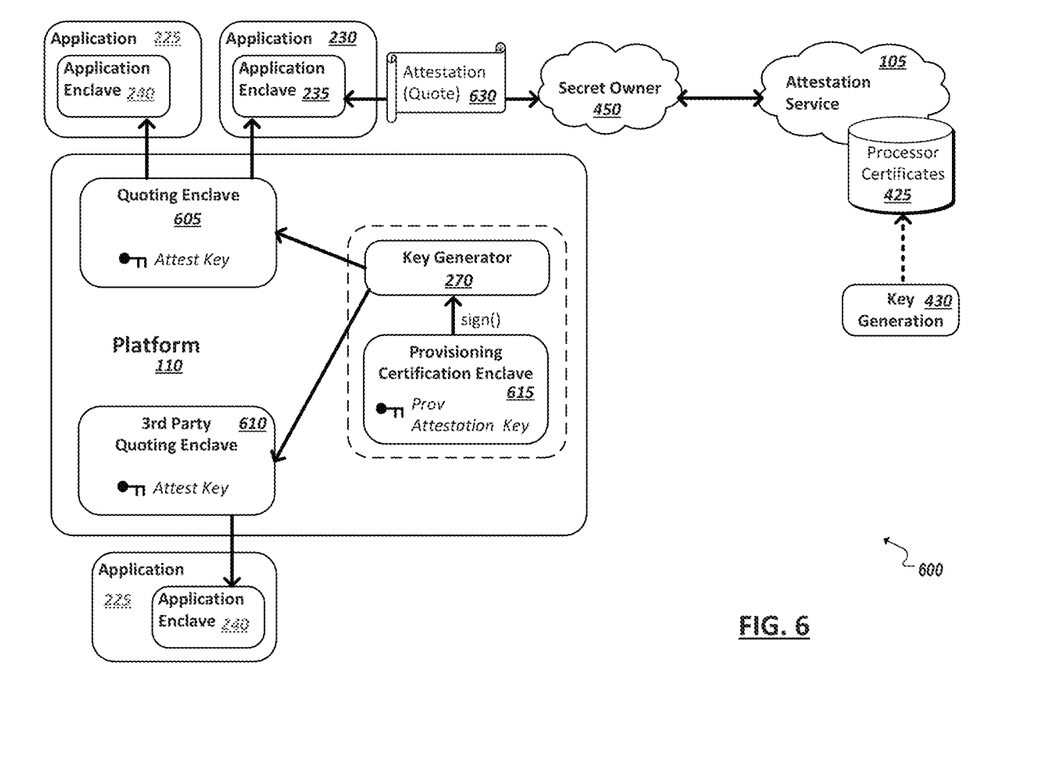
FIG. 6 is a simplified block diagram representing a third implementation of a system supporting attestation in accordance with one embodiment.

Upon generating an attestation key pair, the key generator enclave 270 can request that the provisioning certification enclave 550 sign the public key in the pair as a form of quote to attest to the security and authenticity of the key generator enclave 270. In one implementation, the provisioning certification enclave signs the public key of the attestation key pair with the hardware-based provisioning attestation key. The signed public key can serve as a certification issued/signed using the provisioning attestation key (which is based on a hardware-rooted secret of the host platform 110). Processor certificates 425 generated from the root keys of the host platforms (e.g., 110) and possessed by a corresponding attestation service 105 can verify the signature produced by the provisioning certification enclave 550 based on the provisioning attestation key, as in other examples, in that the processor certificates may be generated at manufacture time in connection with the provisioning of the hardware-based secret upon which the provisioning attestation key is based. In one example, the signed public key can be sent (e.g., by the provisioning certification enclave 550 or another enclave (not shown)) to an external entity for delivery directly to the attestation service 105. In other examples, the signed public key can be provided to the quoting enclave 605 to be appended to quotes (e.g., 630) generated and signed by the quoting enclave 605, for eventual delivery to the attestation service 105. The attestation service 105 may receive quotes (for instance, as forwarded by a corresponding backend service or other secret owner 450) from the application enclave 235 of a particular application 230 (as generated by the quoting enclave 605) and identify the corresponding signed public key (e.g., in the quote itself). The attestation service 105 can query its collection of processor certificates 425 to verify that the public key was signed by (the provisioning attestation key of) a reputable platform (e.g., 110) to conclude that data (e.g., quotes 630) signed by the quoting enclave 605 (e.g., using the private key of the attestation key pair) are likewise to be trusted. The attestation service 105 can then further verify that the quote 630 was signed by the private key of the attestation key pair and consume the data describing the application contained in the quote to complete the attestation.

Figure 7:
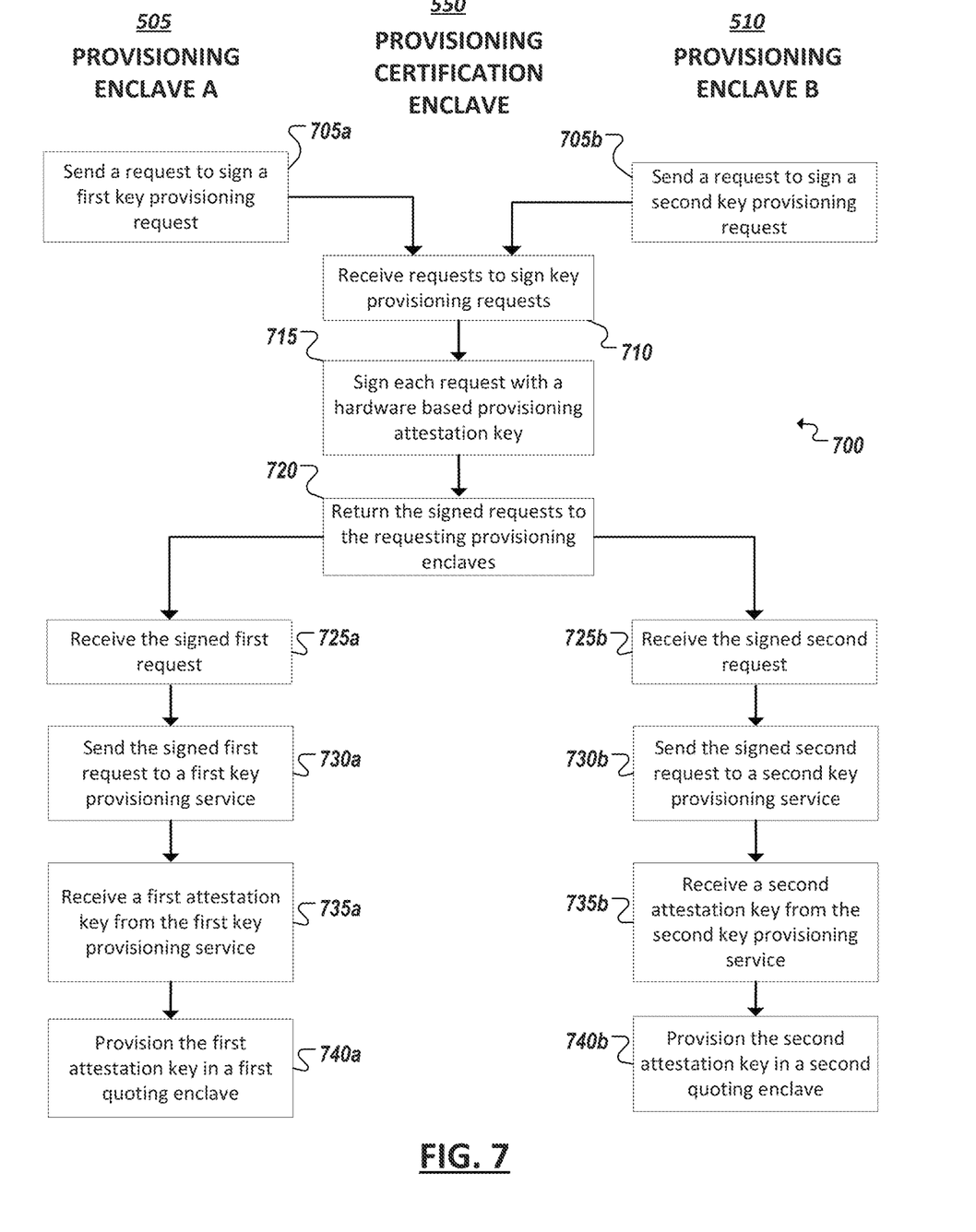
FIG. 7 is a simplified flow chart illustrating an example technique utilizing a provisioning certification enclave hosted on a particular platform.

Turning to FIG. 7, simplified block diagram 700 is shown illustrating an example technique utilizing a provisioning certification enclave hosted on a particular platform. In the example of FIG. 7, multiple key provisioning enclaves (e.g., 505, 510) may send requests (at 705*a,b*) for a provisioning certification enclave 550 to sign respective key provisioning requests to be sent to various key provisioning services. The provisioning certification enclave 550 may receive 710 the requests and sign 715 each of the requests with a hardware-based provisioning attestation key (e.g., derived from a hardware-rooted key of the host platform). The provisioning certification enclave may return 720 the signed requests to each of the requesting provisioning enclaves 505, 510. A first provisioning enclave 505 may correspond to a first quoting enclave that uses an attestation key that is provisioned by a first provisioning service. The first provisioning enclave 505 may receive 725*a* the signed key request from the provisioning certification enclave 550 and send 730*a* the signed key request to the first provisioning service. The first provisioning service may verify the authenticity of the request based on it being signed by the provisioning attestation key and may provide (at 735*a*) a first attestation key to the first key provisioning enclave 505. The first provisioning enclave 505 may then provide the received first attestation key in the first quoting enclave.

Likewise, a second provisioning enclave 510 may be provided which is to obtain attestation key (e.g., a different type or form of attestation key than used by the first quoting enclave) for a second quoting enclave, also hosted on the platform. The second provisioning enclave 510 may receive 725*b* its signed key request back from the provisioning certification enclave 550 and send 725*b* its signed key request to another, second provisioning service and receive 730*b* a second attestation key in response. The second provisioning enclave 510 may then provide the received second attestation key in the second quoting enclave.

Figure 8:
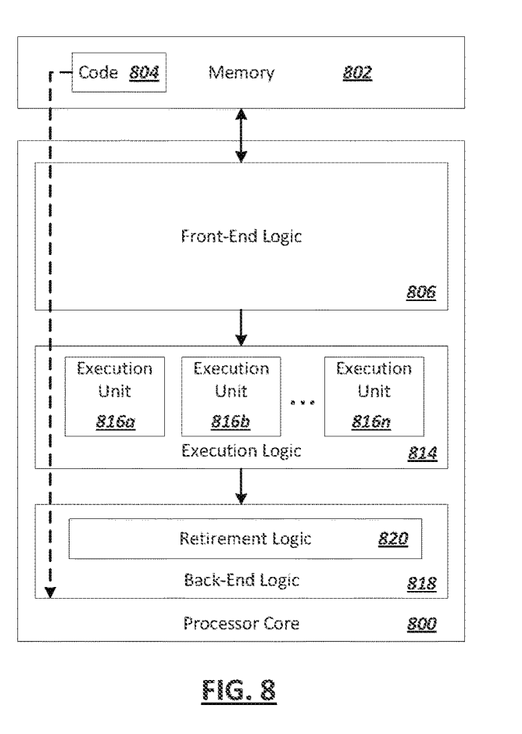
FIG. 8 is a block is a block diagram of an exemplary processor in accordance with one embodiment.
Figure 9:
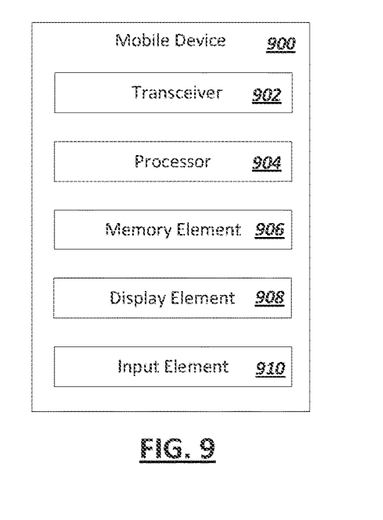
FIG. 9 is a block diagram of an exemplary mobile device system in accordance with one embodiment.
Figure 10:
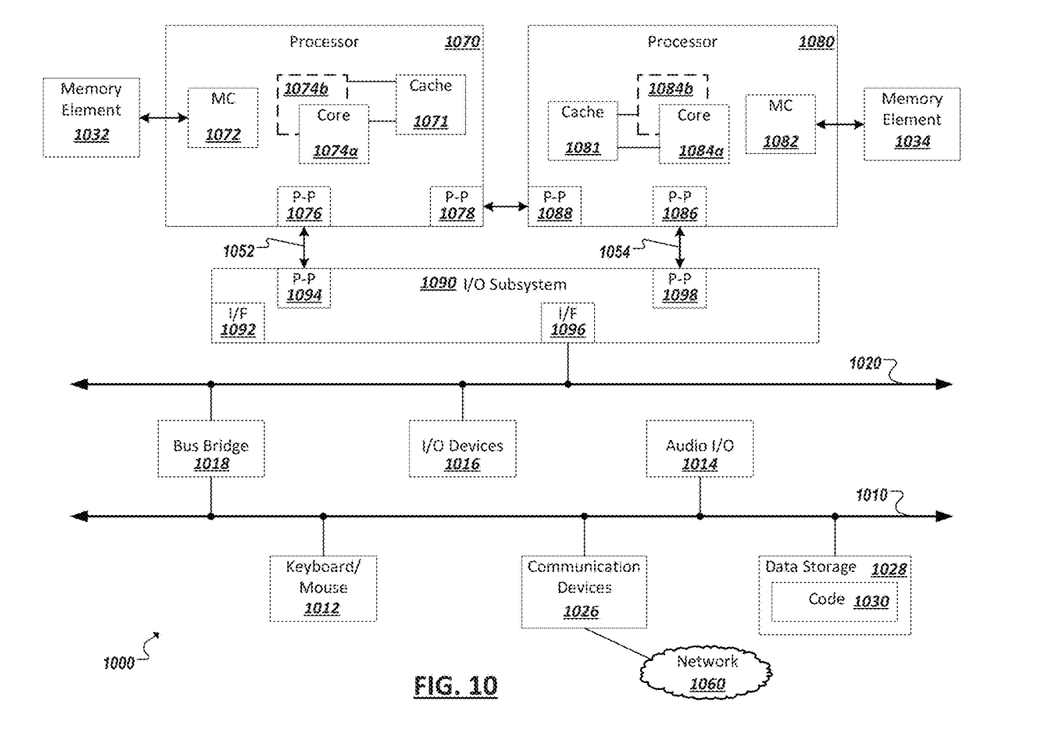
FIG. 10 is a block diagram of an exemplary computing system in accordance with one embodiment.

FIGS. 8-10 are block diagrams of exemplary computer architectures that may be used in accordance with embodiments disclosed herein. Other computer architecture designs known in the art for processors, mobile devices, and computing systems may also be used. Generally, suitable computer architectures for embodiments disclosed herein can include, but are not limited to, configurations illustrated in FIGS. 8-10.

FIG. 8 is an example illustration of a processor according to an embodiment. Processor 800 is an example of a type of hardware device that can be used in connection with the implementations above.

Processor 800 may be any type of processor, such as a microprocessor, an embedded processor, a digital signal processor (DSP), a network processor, a multi-core processor, a single core processor, or other device to execute code. Although only one processor 800 is illustrated in FIG. 8, a processing element may alternatively include more than one of processor 800 illustrated in FIG. 8. Processor 800 may be a single-threaded core or, for at least one embodiment, the processor 800 may be multi-threaded in that it may include more than one hardware thread context (or "logical processor") per core.

FIG. 8 also illustrates a memory 802 coupled to processor 800 in accordance with an embodiment. Memory 802 may be any of a wide variety of memories (including various layers of memory hierarchy) as are known or otherwise available to those of skill in the art. Such memory elements can include, but are not limited to, random access memory (RAM), read only memory (ROM), logic blocks of a field programmable gate array (FPGA), erasable programmable read only memory (EPROM), and electrically erasable programmable ROM (EEPROM).

Processor 800 can execute any type of instructions associated with algorithms, processes, or operations detailed herein. Generally, processor 800 can transform an element or an article (e.g., data) from one state or thing to another state or thing.

Code 804, which may be one or more instructions to be executed by processor 800, may be stored in memory 802, or may be stored in software, hardware, firmware, or any suitable combination thereof, or in any other internal or external component, device, element, or object where appropriate and based on particular needs. In one example, processor 800 can follow a program sequence of instructions indicated by code 804. Each instruction enters a front-end logic 806 and is processed by one or more decoders 808. The decoder may generate, as its output, a micro operation such as a fixed width micro operation in a predefined format, or may generate other instructions, microinstructions, or control signals that reflect the original code instruction. Front-end logic 806 also includes register renaming logic 810 and scheduling logic 812, which generally allocate resources and queue the operation corresponding to the instruction for execution.

Processor 800 can also include execution logic 814 having a set of execution units 816a, 816b, 816n, etc. Some embodiments may include a number of execution units dedicated to specific functions or sets of functions. Other embodiments may include only one execution unit or one execution unit that can perform a particular function. Execution logic 814 performs the operations specified by code instructions.

After completion of execution of the operations specified by the code instructions, back-end logic 818 can retire the instructions of code 804. In one embodiment, processor 800 allows out of order execution but requires in order retirement of instructions. Retirement logic 820 may take a variety of known forms (e.g., re-order buffers or the like). In this manner, processor 800 is transformed during execution of code 804, at least in terms of the output generated by the decoder, hardware registers and tables utilized by register renaming logic 810, and any registers (not shown) modified by execution logic 814.

Although not shown in FIG. 8, a processing element may include other elements on a chip with processor 800. For example, a processing element may include memory control logic along with processor 800. The processing element may include I/O control logic and/or may include I/O control logic integrated with memory control logic. The processing element may also include one or more caches. In some embodiments, non-volatile memory (such as flash memory or fuses) may also be included on the chip with processor 800.

Referring now to FIG. 9, a block diagram is illustrated of an example mobile device 900. Mobile device 900 is an example of a possible computing system (e.g., a host or endpoint device) of the examples and implementations described herein. In an embodiment, mobile device 900 operates as a transmitter and a receiver of wireless communications signals. Specifically, in one example, mobile device 900 may be capable of both transmitting and receiving cellular network voice and data mobile services. Mobile services include such functionality as full Internet access, downloadable and streaming video content, as well as voice telephone communications.

Mobile device 900 may correspond to a conventional wireless or cellular portable telephone, such as a handset that is capable of receiving "3G", or "third generation" cellular services. In another example, mobile device 900 may be capable of transmitting and receiving "4G" mobile services as well, or any other mobile service.

Examples of devices that can correspond to mobile device 900 include cellular telephone handsets and smartphones, such as those capable of Internet access, email, and instant messaging communications, and portable video receiving and display devices, along with the capability of supporting telephone services. It is contemplated that those skilled in the art having reference to this specification will readily comprehend the nature of modern smartphones and telephone handset devices and systems suitable for implementation of the different aspects of this disclosure as described herein. As such, the architecture of mobile device 900 illustrated in FIG. 9 is presented at a relatively high level. Nevertheless, it is contemplated that modifications and alternatives to this architecture may be made and will be apparent to the reader, such modifications and alternatives contemplated to be within the scope of this description.

In an aspect of this disclosure, mobile device 900 includes a transceiver 902, which is connected to and in communication with an antenna. Transceiver 902 may be a radio frequency transceiver. Also, wireless signals may be transmitted and received via transceiver 902. Transceiver 902 may be constructed, for example, to include analog and digital radio frequency (RF) 'front end' functionality, circuitry for converting RF signals to a baseband frequency, via an intermediate frequency (IF) if desired, analog and digital filtering, and other conventional circuitry useful for carrying out wireless communications over modern cellular frequencies, for example, those suited for 3G or 4G communications. Transceiver 902 is connected to a processor 904, which may perform the bulk of the digital signal processing of signals to be communicated and signals received, at the baseband frequency. Processor 904 can provide a graphics interface to a display element 908, for the display of text, graphics, and video to a user, as well as an input element 910 for accepting inputs from users, such as a touchpad, keypad, roller mouse, and other examples. Processor 904 may include an embodiment such as shown and described with reference to processor 800 of FIG. 8.

In an aspect of this disclosure, processor 904 may be a processor that can execute any type of instructions to achieve the functionality and operations as detailed herein. Processor 904 may also be coupled to a memory element 906 for storing information and data used in operations performed using the processor 904. Additional details of an example processor 904 and memory element 906 are subsequently described herein. In an example embodiment, mobile device 900 may be designed with a system-on-a-chip (SoC) architecture, which integrates many or all components of the mobile device into a single chip, in at least some embodiments.

FIG. 10 illustrates a computing system 1000 that is arranged in a point-to-point (PtP) configuration according to an embodiment. In particular, FIG. 10 shows a system where processors, memory, and input/output devices are interconnected by a number of point-to-point interfaces. Generally, one or more of the computing systems described herein may be configured in the same or similar manner as computing system 1000.

Processors 1070 and 1080 may also each include integrated memory controller logic (MC) 1072 and 1082 to communicate with memory elements 1032 and 1034. In alternative embodiments, memory controller logic 1072 and 1082 may be discrete logic separate from processors 1070 and 1080. Memory elements 1032 and/or 1034 may store various data to be used by processors 1070 and 1080 in achieving operations and functionality outlined herein.

Processors 1070 and 1080 may be any type of processor, such as those discussed in connection with other figures. Processors 1070 and 1080 may exchange data via a point-to-point (PtP) interface 1050 using point-to-point interface circuits 1078 and 1088, respectively. Processors 1070 and 1080 may each exchange data with a chipset 1090 via individual point-to-point interfaces 1052 and 1054 using point-to-point interface circuits 1076, 1086, 1094, and 1098. Chipset 1090 may also exchange data with a high-performance graphics circuit 1038 via a high-performance graphics interface 1039, using an interface circuit 1092, which could be a PtP interface circuit. In alternative embodiments, any or all of the PtP links illustrated in FIG. 10 could be implemented as a multi-drop bus rather than a PtP link.

Chipset 1090 may be in communication with a bus 1020 via an interface circuit 1096. Bus 1020 may have one or more devices that communicate over it, such as a bus bridge 1018 and I/O devices 1016. Via a bus 1010, bus bridge 1018 may be in communication with other devices such as a keyboard/mouse 1012 (or other input devices such as a touch screen, trackball, etc.), communication devices 1026 (such as modems, network interface devices, or other types of communication devices that may communicate through a computer network 1060), audio I/O devices 1014, and/or a data storage device 1028. Data storage device 1028 may store code 1030, which may be executed by processors 1070 and/or 1080. In alternative embodiments, any portions of the bus architectures could be implemented with one or more PtP links.

The computer system depicted in FIG. 10 is a schematic illustration of an embodiment of a computing system that may be utilized to implement various embodiments discussed herein. It will be appreciated that various components of the system depicted in FIG. 10 may be combined in a system-on-a-chip (SoC) architecture or in any other suitable configuration capable of achieving the functionality and features of examples and implementations provided herein.

Although this disclosure has been described in terms of certain implementations and generally associated methods, alterations and permutations of these implementations and methods will be apparent to those skilled in the art. For example, the actions described herein can be performed in a different order than as described and still achieve the desirable results. As one example, the processes depicted in the accompanying figures do not necessarily require the particular order shown, or sequential order, to achieve the desired results. In certain implementations, multitasking and parallel processing may be advantageous. Additionally, other user interface layouts and functionality can be supported. Other variations are within the scope of the following claims.

While the present invention has been described with respect to a limited number of embodiments, those skilled in the art will appreciate numerous modifications and variations therefrom. It is intended that the appended claims cover all such modifications and variations as fall within the true spirit and scope of this present invention.

Aspects of the embodiments can include one or a combination of the following examples:

Example 1 is an apparatus, system, method, or computer readable medium with executable instructions to receive a first request from a first provisioning enclave implemented on a computing platform to sign first data using a hardware-based provisioning attestation key, sign the first data using the provisioning attestation key, return the signed first data to the first provisioning enclave, where the signed first data is to authenticate the first provisioning enclave to a first provisioning service in association with generation of a first attestation key to attest characteristics of a first application on the computing platform, receive a second request from a second provisioning enclave implemented on the computing platform to sign second data using the provisioning attestation key, sign the second data using the provisioning attestation key, and return the signed first data to the second provisioning enclave, where the signed second data is to authenticate the second provisioning enclave to a second provisioning service in association with generation of a second attestation key to attest characteristics of a second application on the computing platform.

Example 2 may include the subject matter of example 1, where the provisioning attestation key is based on a secret persistently stored on the computing platform.

Example 3 may include the subject matter of example claim 2, where the provisioning attestation key is derived from fuses set in the computing platform.

Example 4 may include the subject matter of any one of examples 1-3, where the provisioning attestation key corresponds to a certificate held by both the first and second provisioning services.

Example 5 may include the subject matter of example 4, where the certificate corresponds to a root key of the computing platform.

Example 6 may include the subject matter of any one of examples 1-5, where the first attestation key is a cryptographic key of a first type and the second attestation key is a cryptographic key of a different, second type.

Example 7 may include the subject matter of example 6, where the first attestation key includes an Enhanced Privacy Identifier (EPID) key and the second attestation key includes a Rivest-Shamir-Adleman (RSA) key.

Example 8 may include the subject matter of any one of examples 1-7, where the instructions are further operable to instantiate a provisioning certification enclave on the computing platform, and the provisioning certification enclave is to maintain the provisioning attestation key and sign the first and second data using the provisioning attestation key.

Example 9 is a system including a computing platform including one or more secure memory blocks, a first application, a second application, and software logic to implement one or more secure enclaves using the secure memory blocks. The one or more secure enclaves include: a first provisioning enclave to interface with a first provisioning service to obtain a first attestation key from the first provisioning service, where the first attestation key is associated with attestation of the first application; a second provisioning enclave to interface with a different, second provisioning service to obtain a second attestation key from the second provisioning service, where the second attestation key is associated with attestation of the second application; and a provisioning certification enclave to sign first data using a hardware-based provisioning attestation key, where the signed first data is used by the first provisioning enclave to authenticate to the first provisioning service, and the provisioning certification enclave is to further sign second data using the hardware-based provisioning attestation key, where the signed second data is used by the second provisioning enclave to authenticate to the second provisioning service.

Example 10 may include the subject matter of example 9, where the one or more secure enclaves further include a first quoting enclave to send a request for an attestation key to the first provisioning enclave, receive the first attestation key from the first provisioning enclave in response to the request, generate first quote data describing characteristics of the first application and including a signature using the first attestation key; and a second quoting enclave to send a request for an attestation key to the second provisioning enclave, receive the second attestation key from the second provisioning enclave in response to the request, generate second quote data describing characteristics of the second application and including a signature using the second attestation key.

Example 11 may include the subject matter of example 10, further including a first application enclave securing at least a portion of the first application and a second application enclave securing at least a portion of the second application, where the first quote data describes characteristics of the first application enclave and the second quote data describes characteristics of the second application enclave.

Example 12 may include the subject matter of any one of examples 9-11, where the first provisioning service uses a first cryptographic technology and the second provisioning service uses a second.

Example 13 may include the subject matter of example 12, where the first attestation key is a first type of cryptographic key and the second attestation key is a second type of cryptographic key.

Example 14 may include the subject matter of any one of examples 9-13, where the one or more secure enclaves further include a key generator enclave to generate a third attestation key including a public and private key pair, the provisioning certification enclave is to sign the public key of the third attestation key, and the third attestation key is to be used in attestation of a third application of the computing platform.

Example 15 is an apparatus, system, method, or computer readable medium with executable instructions to implement a secure key generation enclave on a computing platform, the secure key generation enclave to generate an attestation key including a public key and a private key, where the attestation key is for use in attestation of at least one application of the computing platform, and to further implement a secure provisioning certification enclave on a computing platform. The provisioning certification enclave is to receive a request from the key generation enclave to sign the public key using a hardware-based provisioning attestation key, sign the public key using the provisioning attestation key, and return the signed public key to the key generation enclave, where the signed public key is to authenticate the key generation enclave to a provisioning service in association with the attestation of the at least one application.

Example 16 may include the subject matter of example 15, where the attestation key is randomly generated.

Example 17 may include the subject matter of any one of examples 15-16, where the attestation key includes an RSA key pair.

Example 18 may include the subject matter of any one of examples 15-17, where the attestation key includes a first attestation key and the application includes a first application, the key generation enclave is to provide the signed public key to and the private key to a first quoting enclave associated with the first application, and the key generation enclave is further to generate a second attestation key for use in attestation of a second application using a second quoting enclave, and the provisioning certification enclave is to sign a public key of the second attestation key using the provisioning attestation key.

Example 19 may include the subject matter of any one of example 15 where th attestation key is generated from a hardware-rooted secret.

Example 20 may include the subject matter of any one of examples 15-18, where the provisioning attestation key is derived from a hardware-rooted secret data on the computing platform.

Example 21 may include the subject matter of example 19, where the hardware-rooted secret data includes a root key While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results.

What is claimed is:

1. One or more non-transitory computer-readable media having instructions stored thereon that, upon execution of the instructions by one or more processors of a computing device, are to cause the computing device to:
   instantiate a first logical component on a computing device;
   identify a first request from a second logical component, wherein the first request is related to use of the hardware-based key to sign first data based on the hardware-based key, wherein the first logical component is to maintain the hardware-based key;
   sign, by the first logical component, the first data based on the hardware-based key; and
   return the signed first data to the second logical component, wherein the signed first data is to authenticate the second logical component to a first service in association with generation of a second key that is to attest characteristics of a first application on the computing-device.

2. The one or more non-transitory computer-readable media of claim 1, wherein the hardware-based key is based on a root key persistently stored on the computing device.

3. The one or more non-transitory computer-readable media of claim 1, wherein the hardware-based key is derived from fuses set in the computing-device.

4. The one or more non-transitory computer-readable media of claim 1, wherein the instructions are further to:
   identify a second request from a third logical component implemented on the computing-device, wherein the second request is related to use of the hardware-based key to sign second data;
   sign, by the first logical component, the second data based on the hardware-based key; and return the signed second data to the third logical component, wherein the signed second data is to authenticate the third logical component to a second service in association with generation of a third key that is to attest characteristics of a second application on the computing-device.

5. The one or more non-transitory computer-readable media of claim 4, wherein the hardware-based key corresponds to a certificate held by both the first and second services.

6. The one or more non-transitory computer-readable media of claim 4, wherein the second key is a cryptographic key of a first type and the third key is a cryptographic key of a different, second type.

7. The one or more non-transitory computer-readable media of claim 6, wherein the second key is an Enhanced Privacy Identifier (EPID) key and the third key comprises an Elliptic Curve Digital Signature Algorithm (ECDSA) key or a Rivest-Shamir-Adleman (RSA) key.

* * * * *